(12) United States Patent
Beyer et al.

(10) Patent No.: US 12,001,897 B2
(45) Date of Patent: Jun. 4, 2024

(54) RESILIENT ASYNCHRONOUS REQUEST-REPLY SOLUTION FOR MESSAGE-DRIVEN ARCHITECTURES

(71) Applicant: SAP SE, Walldorf (DE)

(72) Inventors: Bertram Beyer, Nussloch (DE); Kevin Sieverding, Heidelberg (DE)

(73) Assignee: SAP SE, Walldorf (DE)

( * ) Notice: Subject to any disclaimer, the term of this patent is extended or adjusted under 35 U.S.C. 154(b) by 130 days.

(21) Appl. No.: 17/734,928

(22) Filed: May 2, 2022

(65) Prior Publication Data
US 2023/0350739 A1 Nov. 2, 2023

(51) Int. Cl.
*G06F 9/54* (2006.01)

(52) U.S. Cl.
CPC .............. *G06F 9/546* (2013.01); *G06F 9/547* (2013.01)

(58) Field of Classification Search
None
See application file for complete search history.

(56) References Cited

U.S. PATENT DOCUMENTS

| | | | | |
|---|---|---|---|---|
| 7,516,176 | B2 * | 4/2009 | Potter | H04L 69/329 709/201 |
| 2004/0210420 | A1 * | 10/2004 | Lee | H04L 41/0273 702/186 |
| 2012/0102109 | A1 * | 4/2012 | Eberhard | G06F 9/546 709/204 |
| 2019/0158566 | A1 * | 5/2019 | Farmer | G06F 9/44505 |
| 2020/0204612 | A1 * | 6/2020 | Tan | H04L 67/10 |

FOREIGN PATENT DOCUMENTS

WO  WO 2012155440 A1 * 11/2012 ............. H04L 67/02

* cited by examiner

*Primary Examiner* — Charles E Anya
(74) *Attorney, Agent, or Firm* — Mintz Levin Cohn Ferris Glovsky and Popeo, P.C.

(57) ABSTRACT

A method for a resilient asynchronous request-reply solution may include initiating, in response to receiving a request from a client device, a process for executing the request using a first service and a second service. The method may include persisting the request as a command in a database accessible to a first instance of the first service and a second instance of the first service. The persisting is performed by a first thread, and the persisting includes storing an association between the first thread and the command. The method also includes sending the command from the first service to the second service, receiving, from the second service, a response to the command, updating, in response to the receiving, the command in the database to include the response, and providing, the response to complete the process. Related systems and articles of manufacture are provided.

14 Claims, 12 Drawing Sheets

RESILIENT ASYNCHRONOUS REQUEST-REPLY SOLUTION FOR MESSAGE-DRIVEN ARCHITECTURES

TECHNICAL FIELD

The subject matter described herein relates generally to messaging systems and more specifically to resilient asynchronous request-reply architectures.

BACKGROUND

In microservice architectures, a system is divided into multiple separated services. In many instances, the services communicate with one another to respond to requests. For example, a user may request execution of a process from a first service, which in turn requires collaboration with a second service to complete the request. The communications between the user and the services may be implemented synchronously or asynchronously

SUMMARY

Systems, methods, and articles of manufacture, including computer program products, are provided for a resilient asynchronous request-reply architecture. In one aspect, there is provided a system. The system may include at least one data processor and at least one memory. The at least one memory may store instructions that result in operations when executed by the at least one data processor. The operations may include: initiating, in response to receiving a request from a client device, a process for executing the request using a first service and a second service. The operations may also include persisting the request as a command in a database accessible to a first instance of the first service and a second instance of the first service. The persisting is performed by a first thread of the first instance. The persisting may include storing an association between the first thread and the command. The operations may also include sending, by the first thread, the command from the first service to the second service. The operations may also include receiving, by a second thread of the first instance and from the second service, a response to the command. The operations may also include updating, by the second thread and in response to the receiving, the command in the database to include the response. The operations may also include providing, by the first thread and via the client device, the response to complete the process.

In some variations, the operations further include: determining an error in the process. The response is provided after a refresh of an application at the client device.

In some variations, the operations further include: unblocking, after the refresh, the first thread of the first instance of the first service, the unblocking configured to allow the response to be provided to complete the process.

In some variations, the error includes at least one of a timeout prior to receiving the response, a session failure, a service failure, and a routing failure. The at least one of the timeout, the session failure, the service failure, and the routing failure are configured to cause the request to be closed at the first instance of the first service.

In some variations, the operations further include: storing, at the first service, the request in a local memory of the first instance of the first service.

In some variations, the first thread is configured to call a command controller to persist the request in the local memory of the first instance of the first service.

In some variations, the request is an HTTP-request.

In some variations, the first thread is at least one request thread and the second thread is at least one listener thread.

In some variations, a computer-implemented method includes: initiating, in response to receiving a request from a client device, a process for executing the request using a first service and a second service. The method also includes persisting the request as a command in a database accessible to a first instance of the first service and a second instance of the first service. The persisting is performed by a first thread of the first instance. The persisting includes storing an association between the first thread and the command. The method also includes sending, by the first thread, the command from the first service to the second service. The method also includes receiving, by a second thread of the first instance and from the second service, a response to the command. The method also includes updating, by the second thread and in response to the receiving, the command in the database to include the response. The method further includes providing, by the first thread and via the client device, the response to complete the process.

A non-transitory computer-readable medium storing instructions, which when executed by at least one data processor, result in operations including initiating, in response to receiving a request from a client device, a process for executing the request using a first service and a second service. The operations may also include persisting the request as a command in a database accessible to a first instance of the first service and a second instance of the first service. The persisting is performed by a first thread of the first instance. The persisting may include storing an association between the first thread and the command. The operations may also include sending, by the first thread, the command from the first service to the second service. The operations may also include receiving, by a second thread of the first instance and from the second service, a response to the command. The operations may also include updating, by the second thread and in response to the receiving, the command in the database to include the response. The operations may also include providing, by the first thread and via the client device, the response to complete the process.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
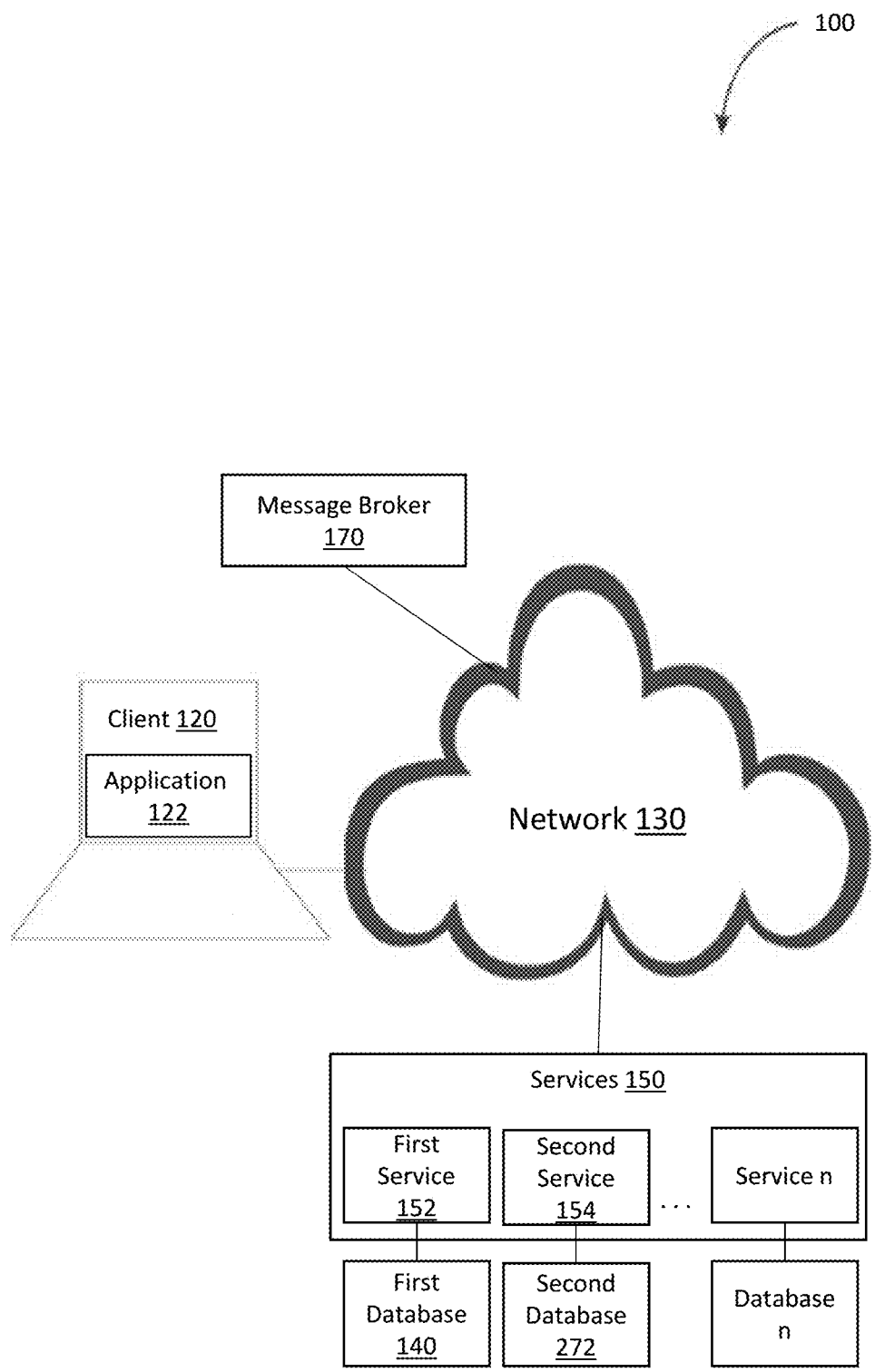
FIG. 1 depicts a system diagram illustrating a messaging system, in accordance with some example embodiments.

In microservice architectures, a system is divided into multiple separated services that communicate with one another to respond to requests. For example, a user may request execution of a process from a first service, which in turn requires collaboration with a second service to complete the request. The communications between the user and the services may be implemented synchronously or asynchronously.

Synchronous communication is often implemented via representational state transfer ("REST") whereas asynchronous communication is often implemented via a message broker. As an example, synchronous and asynchronous communications may involve communications between a user at a client device, a Service A (e.g., a first service), and Service B (e.g., a second service). In an example implementing synchronous communications, the user would submit a request to Service A and wait for a response from Service A. In the meantime, Service A opens a request to Service B and waits for the response. Once Service A receives the response, it provides the response to the user. As another example, the user may submit a request to Service A and wait for a response from Service A. Service A may block (e.g., lock) the request and send a message to Service B, which receives the message, processes the message, and sends a reply message to Service A. Service A then consumes the reply, unblocks the request, and returns the reply to the user. In these examples, the asynchronous nature of the service-to-service communication is thereby hidden to facilitate the synchronous client-service communication.

As an example implementing asynchronous communications, the user may submit a request to Service A and wait for a response from Service A. Unlike the synchronous communications examples, Service A persists the request locally, sends a message to Service B, and replies to the user with an ACCEPTED response without waiting for the result. Service B receives the message and sends a reply message back to Service A. Service A consumes the reply and updates its local persistency. In this example, the user updates its local view afterwards by manual request, polling, long polling, Web Sockets, or other push techniques to receive the response to the request. The communications are asynchronous in this example because the user, Service A, and Service B do not communicate concurrently. In other words, the communications are not synchronized with respect to timing.

In these examples of synchronous and asynchronous communications, the communications flow between the user and the services, as well as between the services, may break due to various errors, such as timeouts, session failure, service failure, and partition failure, in the processing of the request. However, since information relating to the request may be stored in only the local memory of the services, and the errors may occur at any time (e.g., before the services receive the reply message, after the services receive the reply message but before the reply is provided to the user, or another error arises), the request will be erased when the user reloads the frontend application, even if the request was already executed. Thus, the services will not be able to complete the request and provide the response to the user.

Additionally, given the errors that may occur during processing of the request, providing users with feedback for their actions can be challenging when using asynchronous communications due to the mode switch between the user's synchronous requests and the asynchronous processing of the request. For example, manual polling (e.g., requesting the user to continuously refresh the page until they received their result) can provide a poor user experience and short polling (e.g., letting the page continuously poll for a result) may be resource inefficient and may introduce an artificial delay due to polling intervals. Long polling or streaming solutions can be helpful in some instances, but many applications do not support such solutions. For example, microservice applications may sit behind a reverse proxy, which might not support long polling or streaming. Furthermore, certain applications may not support asynchronous communications, reducing the resiliency of those applications when errors occur.

The messaging system consistent with embodiments of the current subject matter provides a resilient asynchronous request-reply architectures that can resiliently and consistently accommodate errors that occur during the processing of users' requests. For example, the messaging system may combine a message broker-based asynchronous request-reply pattern with a persisted command model to ensure consistency. The messaging system may also provide a synchronous user experience in non-exceptional cases (e.g., during which no error occurs), but providing a fallback for exceptional cases (e.g., during which an error occurs). Accordingly, the messaging system may improve the user experience in both exceptional and non-exceptional cases.

The messaging system may initiate a process for executing a request received from a client device (e.g., a user's browser session at a frontend application) and persist the request as a command in a database accessible to multiple instances of a corresponding one of the services within the messaging system. For example, the messaging system may persist the request as a command in a database accessible to multiple instances of a first service. Similarly, another service handling the request may also include a separate database accessible to multiple instances of that other service. Persisting the request as a command in the database accessible to instances of a particular service helps to allow a reply to the request to be paired with the request, regardless of whether an error occurs such that the memory of a service is erased. When an error, such as a timeout prior to receiving the response, a session failure, a service failure, and a routing failure, does occur, the messaging system is still able locate the request in order to provide the reply to the user. Thus, the messaging system may improve the consistency of providing responses to users, such as in the case of various errors or failure scenarios and may improve the user experience.

FIG. 1 depicts a system diagram illustrating a messaging system 100, in accordance with some example embodiments. Referring to FIG. 1, the messaging system 100 may include a client 120 (e.g., a client device), a message broker 170, and a plurality of services 150. As shown in FIG. 1, the client 120, the message broker 170, and the plurality of services 150 and/or any components thereof may be communicatively coupled via a network 130. The network 130 may be any wired and/or wireless network including, for example, a wide area network (WAN), a local area network (LAN), a virtual local area network (VLAN), a public land mobile network (PLMN), the Internet, and/or the like. The messaging system 100 may include a processor and/or a memory storing instructions for execution of an operation, such as for executing a request.

The client 120 may be a mobile device including, for example, a smartphone, a tablet computer, a wearable apparatus, and/or the like. However, it should be appreciated that the client 120 may be any processor-based device including, for example, a laptop computer, a workstation, and/or the like. In some implementations, the client 120 includes an application 122, such as a mobile application or a web-based frontend application, which may be a type of application software configured to run on a mobile device or any processor-based device. Moreover, the application of the client may be a web application providing a web browser (e.g., a browser session) to the user, at the client 120. This web browser may be an "in-app web browser," which may refer to a web browser that is invoked through a corresponding application instead of being a standalone web browser. As such, the web browser associated with the client 120 may be used to embed web content such as, for example, the requests and/or the replies to the requests, directly within the application of the client 120, without requiring the use of a separate and/or standalone web browser. The application 122 may allow for the user to submit requests to execute a process by the services 150.

The requests may include at least one HTTP-request. In some embodiments, the requests include a send command, a read command, a create command, an update request, a delete request, a handle request, an update command, and/or the like. The application 122 may additionally or alternatively receive and display a response to the submitted request. The client 120 may include a plurality of clients 120. In some embodiments, the client 120 includes a graphical user interface. The user may interact with the graphical user interface.

The services 150 may include one or more application services, cloud services, and/or the like, that execute the process. For example, a user may request execution of the process by a first service, which in turn requires collaboration with a second service to complete the request. Thus, the services 150 may include a first service 152, a second service 154, a service n, and so on.

In some embodiments, communication between the services 150 may be asynchronous and message-based. The message broker 170 (which is described in more detail below) may be used to provide message channels to organize message flows. For example, during processing by the first service 152 of a request received by the first service 152, the first service 152 may send a second request, to process at least a part of the request received by the first service 152 and/or to obtain information needed for processing the request received by the first service 152, to the message broker 170, which directs the second request to the second service 152 to complete the second request and provide a reply to the second request. In other words, the first service 152 may send, directly or indirectly, a request to the second service 154 to complete at least a part of the processing of the request received by the first service 152. Accordingly, the second service 154 may be a command service that assists the first service 152 is processing at least part of the request received by the first service 152.

Figure 2A:
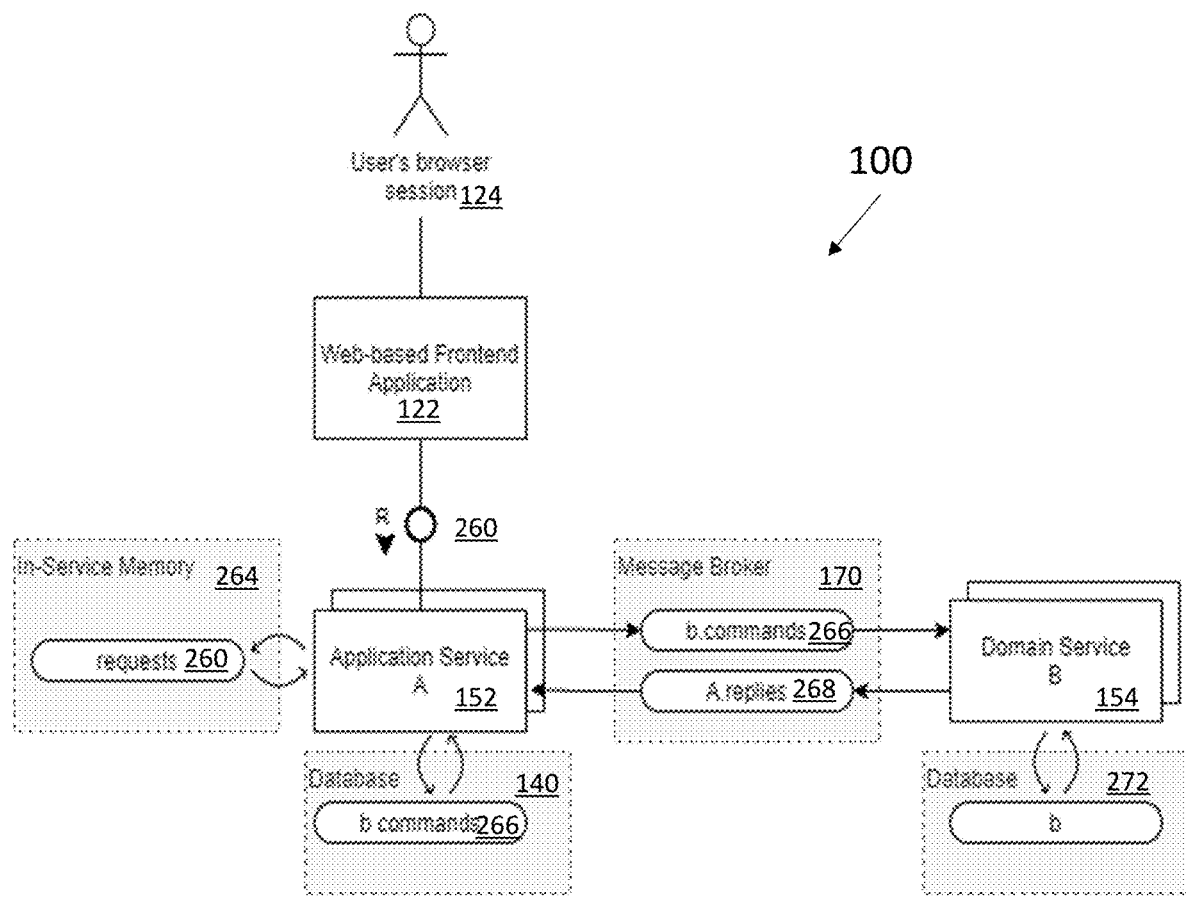
FIG. 2A depicts a diagram of a messaging system, in accordance with some example embodiments.
Figure 2B:
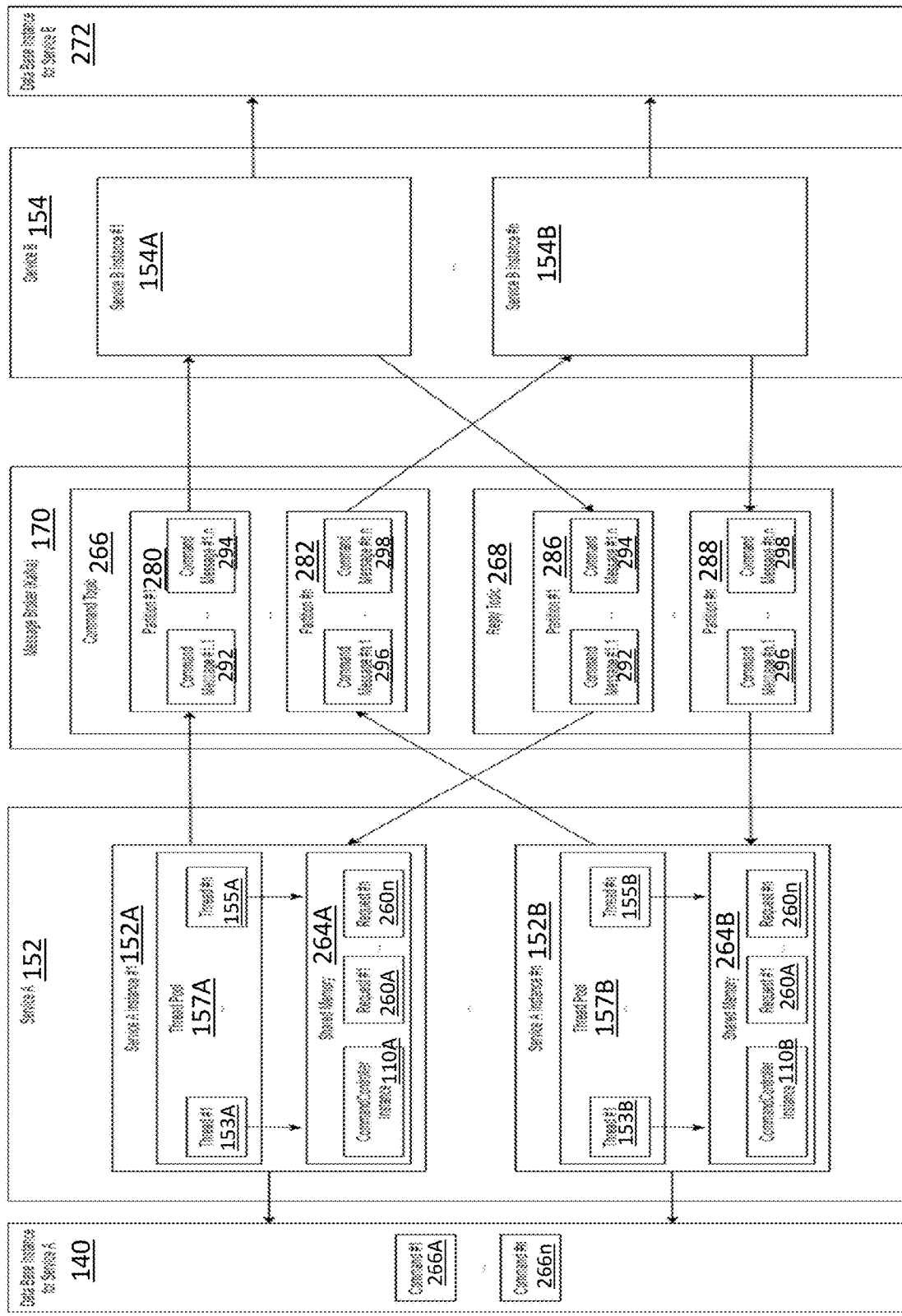
FIG. 2B depicts another diagram of a messaging system, in accordance with some example embodiments.

In some embodiments, the services 150 include application services and/or domain services. For example, the first service 152 may be an application service and the second service 154 may be a domain service. To further illustrate, FIG. 2A and FIG. 2B schematically depict the messaging system 100, in accordance with some example embodiments. As shown in FIG. 2A, via a user's browser session 124, a user may use the application 122 at the client 120 to submit a request 260 (e.g., a synchronous call to an application, such as the first service 152— Application Service A in this example). Incoming requests are generally bound to a particular service instance for processing.

Each service 150, such as the first service 152, the second service 154, and so on, may run multiple times as service instances in different virtual machines. For example, as shown in FIG. 2B, the first service (Service A) 152 includes a first first service instance 152A, a second first service instance 152B, and so on. The second service (Service B) 154 may also include multiple instances, such as a first second service instance 154A and a second second service instance 154B.

Each instance (e.g., the first first service instance 152A, the second first service instance 152B, the first second service instance 154A, the second second service instance 154B, etc.) may include its own thread pool. In other words, all threads of the same service instance have access to the same shared memory. For example, as shown in FIG. 2B, the first first service instance 152A may include a first thread pool 157A and the second first service instance 152B may include a second thread pool 157B. Each of the service instances may also include a dedicated shared memory that is accessible to the thread pool of the particular instance. For example, the first first service instance 152A may include a first shared memory 264A that is accessible to the threads of the first thread pool 157A of the first first service instance 152A. The second first service instance 152B may include a second shared memory 264B that is accessible to the threads of the second thread pool 157B of the second first service instance 152B. The dedicated memory for each corresponding instance of the first service 152 is shown as in-service memory 264 in FIG. 2A.

Referring again to FIGS. 2A and 2B, the shared memory for each instance includes and/or stores a command controller instance and at least one request 260 (e.g., a list of requests). For example, as shown in FIG. 2B, the first shared memory 264A of the first first service instance 152A includes a first command controller instance 110A, a first request 260, and n requests 260n. The second shared memory 264B of the second first service instance 152B includes a second command controller instance 110B, a second request 260B, and n requests 260n. The first command controller instance 110A and the second command controller instance 110B may be instantiated class objects stored in the corresponding first and second shared memory 264A, 264B. The first command controller instance 110A and/or the second command controller instance 110B may be the same and/or may be shared across the instances of the first service 152. The first command controller instance 110A and the second command controller instance 110B may manage one or more requests received from the client 120. In some embodiments, the first command controller instance 110A and the second command controller instance 110B manage a list of requests received from the client 120. As described herein, the first command controller instance 110A and/or the second command controller instance 110B may receive requests to execute a process by the services 150.

The first and second thread pools 157A, 157B each include a plurality of threads that handle the requests and replies (also described herein as "responses") to the requests. For example, each instance of each service 150 may include a pool of threads. For example, as noted above, the first first service instance 152A includes a first thread pool 157A and the second first service instance 152B includes a second thread pool 157B. The first thread pool 157A may include a first thread 153A, a second thread 155A, and so on. The second thread pool 157B may include a first thread 153B, a second thread 155B, and so on. For example, the first thread pool 157A and/or the second thread pool 157B may include at least one request thread, at least one reply or listener thread, and/or the like. The request thread may include an HTTP request thread that processes the received requests. In some embodiments, the user's request is assigned to the first thread 153A or the first thread 153B, which may include a worker thread, a request thread, and/or the like.

Depending on the instance of the first service 152 receiving the request, the first thread 153A or the first thread 153B begins a process for executing the request using the corresponding shared command controller instance 110A or 110B. The incoming reply message from the second service 154 may be assigned to the second thread 155A or the second thread 155B. The second thread 155A or the second thread 155B begins the process for reply processing which uses the corresponding shared command controller instance 110A or 110B. In some embodiments, the first thread 153A or the first thread 153B can use the request to block itself and wait until the second thread 155A or the second thread 155B uses the same request to unblock the second thread 155A or the second thread 155B before providing the reply to the client 120. In some implementations, one randomly picked thread, such as the first thread 153A or the first thread 153B, handles one incoming request and another randomly picked thread, such as the second thread 155A or the second thread 155B, handles the replies. The threads described herein may be execution resources managed centrally. In some implementations, the first thread 153A, the first thread 153B, the second thread 155A, and/or the second thread 155B may be used to handle a request and/or a reply. As such, the first thread 153A or the first thread 153B may be synchronized with the second thread 155A or the second thread 155B.

Referring again to FIG. 1, FIG. 2A, and FIG. 2B, each service 150 may include and/or be communicatively coupled to its own database. Only services of the same type (e.g., the first service 152, the second service 154, the service n shown in FIG. 1 may each be different types of services) may share a database. In other words, services of other types do not have access to a database of another type of service. For example, the first service 152 may be communicatively coupled to a database 140, the second service may be communicatively coupled to a database 272, and the service n may be communicatively coupled to a database n. The database 140 may be accessible to all instances of the first service 152, such as to the first first service instance 152A and the second first service instance 152B. The database 272 may be accessible to all instances of the second service 154, such as the first second service instance 154A and the second second service instance 154B. The database 140 may not be accessible to the instances of the second service 154 and the database 272 may not be accessible to the instances of the first service 152.

The first database 140 may be used to store commands 266, so they are permanently persisted and accessible from all other instances of the first service 152, such as the first first service instance 152A and the second first service instance 152B. For example, as shown in FIG. 2B, commands 266A, 266n are persisted in the database 140 and are accessible to the first first service instance 152A and the second first service instance 152B. As an example, the first thread 153A may receive the request from the client 120. The first thread 153A may persist the request as a command in the database 140, which is accessible to all instances of the first service 152. The first thread 153A may additionally or alternatively store an association between the command and the particular thread that received and/or handled the request. This helps to ensure that any replies to the request can be matched to the request and provided to the client 120, regardless of any errors during the processing of the request.

The database 140 and/or the database 272 may be any type of database including, for example, a graph database, an in-memory database, a relational database, a non-relational (NoSQL) database, and/or the like. The database 140 and/or the database 272 may include one or more (e.g., one, two, three, four, five, or more) databases. Each of the databases may include one or more (e.g., one, two, three, four, five, or more) data sources.

Again referring to FIG. 2A, the command controller (e.g., either the first command controller instance 110A or the second command controller instance 110B) may receive the request 260 to execute a process by the first service 152. To process the request 260, a first instance of the first service 152 (e.g., the first first service instance 152A or the second first service instance 152B) may store the request and/or information relating to the request 260 in memory 264 (corresponding to the shared memory 26A or the shared memory 264B shown in FIG. 2B), which is in-service memory of the corresponding instance of the first service 152. The instance of the first service 152 may also persist the request 260 as a command 266 in the database 140, which is accessible to all instances of the first service 152. The first service 152 may additionally or alternatively store information about the command 266, such as an association between a thread handling the request and the command, in the database 140. The first service 152 may then send the command 266 to the message broker 170, which in turn sends the command 266 to the second service 154—Domain Service B in this example.

FIG. 2B schematically depicts an example of the message broker 170. As shown in FIG. 2B, the message broker 170 may include a command topic or queue 266 and a reply topic or queue 268. The command topic 266 may be a dedicated topic that receives commands from the first service 152, such as from each instance of the first service 152, and sends the commands to an instance of the second service 154 for processing. The reply topic 268 may be a dedicated topic that receives replies from the second service 154, such as from each instance of the second service 154, and sends the replies to an instance of the first service 152 for processing. For example, topics (e.g., the command topic 266 and the reply topic 268) may be separated into partitions. As shown in FIG. 2B, the command topic 266 may be separated into a first partition 280 and a second partition 282, and so on. The reply topic 268 may be separated into a first partition 286, a second partition 288, and so on. The partitions are assignments to particular service instances, which means that all messages sent to a particular partition are processed by the same service instance.

Referring to the example shown in FIG. 2B, the first partition 280 of the command topic 266 is assigned to receive commands (e.g., command messages 292, 294, etc.) from the first first service instance 152A. The second partition 282 of the command topic 266 is assigned to receive commands (e.g., command messages 296, 298, etc.) from the second first service instance 152B. The first partition 286 of the reply topic 268 sends replies to the command messages (e.g., command messages 292, 294, etc.) to the first first service instance 152A. The second partition 288 of the reply topic 268 is assigned to send replies to the command messages (e.g., command messages 296, 298, etc.) to the second first service instance 152B. Partition assignments are stable until a partition rebalancing is triggered, by for example an existing service instance stopping or a new service instance starting or by changes to the topic's partition count. During a partition rebalancing, all service instances which are consuming from a topic receive new partition assignments.

Referring back to FIG. 2A, the second service 154 listens to commands, processes the commands locally and sends a reply 268 via the message broker 170 as described herein. The second service 154 may store information about the reply 268 and/or the command 266 in the database 272, which is accessible to all instances of the second service 154. The first service 152 listens to the replies (e.g., using a reply or listener thread). When receiving the reply 268, the first service 152 updates the database 140 and returns the reply to the user via the application 122.

Figure 4:
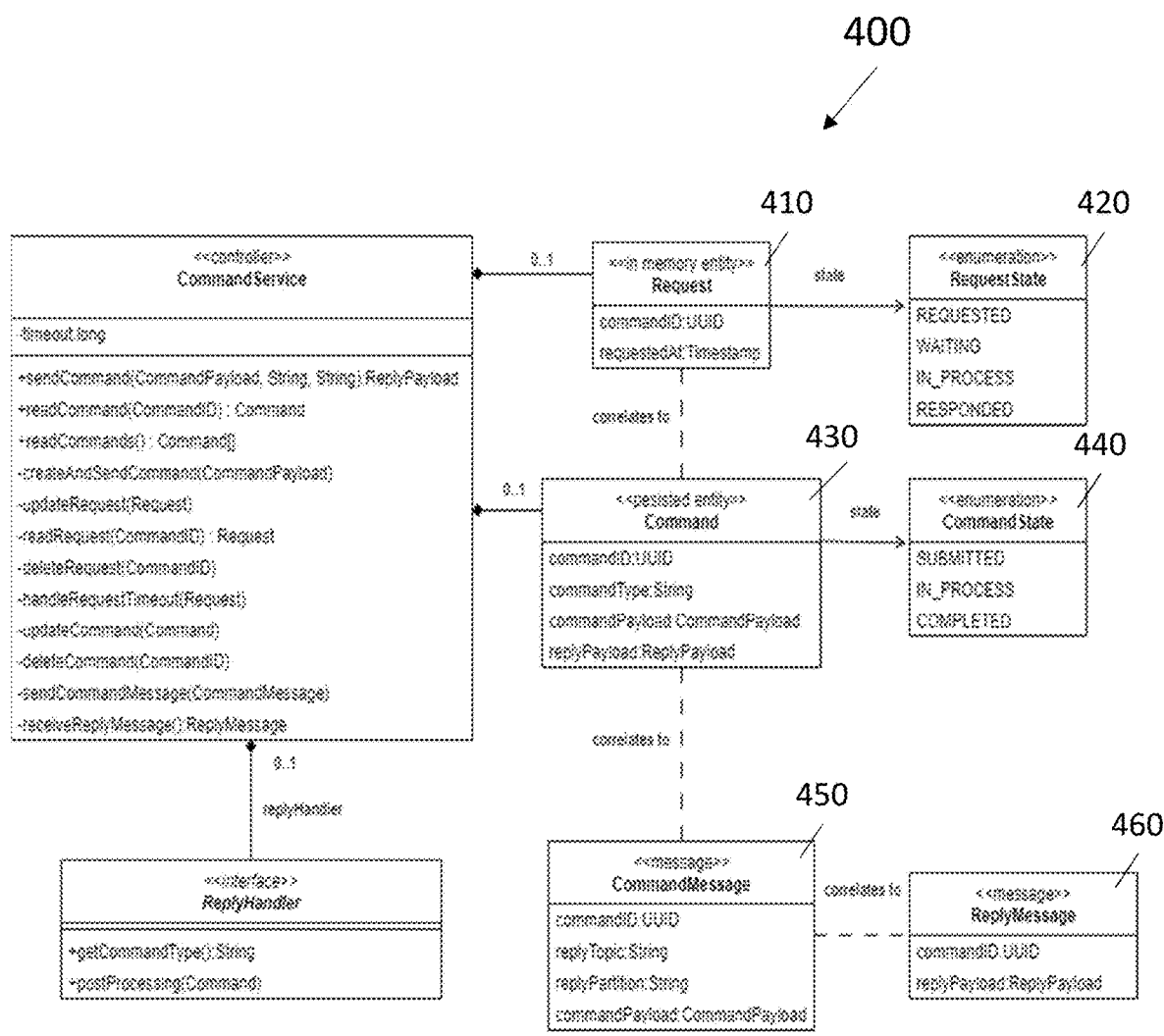
FIG. 4 depicts an example class diagram, in accordance with some example embodiments.

FIG. 4 depicts an example class diagram 400 in accordance with some example embodiments. As shown in FIG. 4, a request 410 stored in the local memory 264 may include an identifier of the command, a timestamp of the request, or the like. A request state 420 may additionally or alternatively be stored in the local memory 264. The request state 420 may include a REQUESTED state, a WAITING state, an IN_PROCESS state, a RESPONDED state, and/or the like.

Again referring to FIG. 4, the request may be persisted as a command. The command controller (e.g., of a corresponding instance of the first service) may communicate with a command container and/or envelope 430. As described herein, the command and/or information about the command may be persisted in the database 140. The information about the command may include an identifier of the command, a type of the command, a payload of the command, a reply payload, and/or the like. A command state 440 may additionally or alternatively be stored in the database 140. The command state 440 may include a SUBMITTED state, an IN_PROCESS state, a COMPLETED state, and/or the like.

In some embodiments, information about the command message sent from the first service 152 to the second service 154 may additionally or alternatively be stored in the database 140. For example, the command message 450 and information about the command message may include a command identifier, a reply topic or queue identifier, a reply partition identifier, a command payload or the like. Information about the reply message sent from the second service 154 to the first service 154 may additionally or alternatively be stored in the database 140, such as when the command is updated when the first service 152 receives a reply from the second service 154. For example, the reply message 460 and information about the reply message may include a command identifier, a reply payload, and/or the like.

Figure 3:
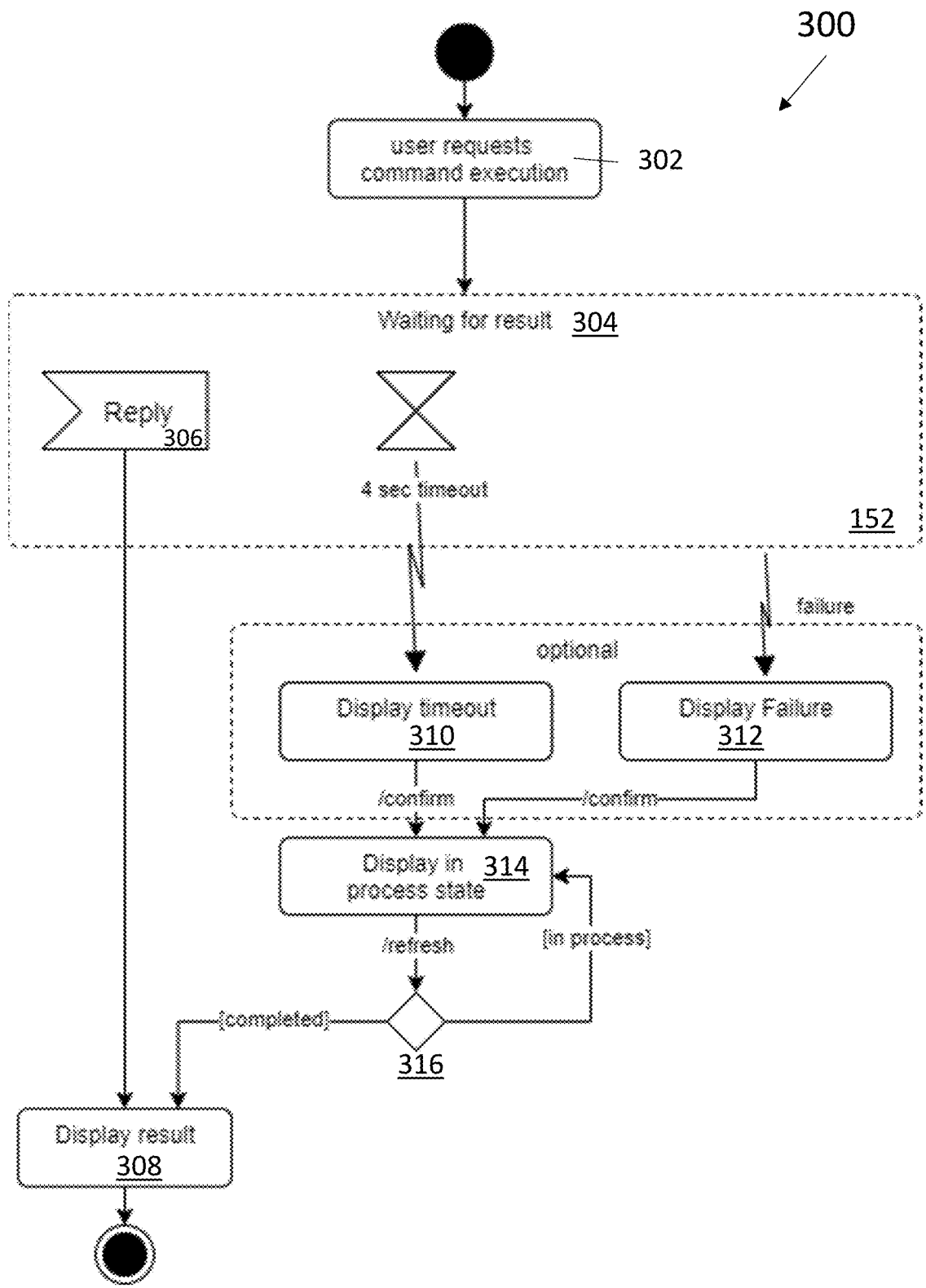
FIG. 3 depicts an example workflow diagram illustrating a process for executing a request, in accordance with some example embodiments.

FIG. 3 depicts an example workflow diagram 300 illustrating a process for executing a request, in accordance with some example embodiments. As shown in FIG. 3, at 302, the user initiates an HTTP-based command request via the frontend application (e.g., the application 122 of the client 120) to the first service 152. By default, the first service 152 waits for the reply, at 304, and the request is blocked until the first service 152 receives the reply from the second service 154 (not shown in FIG. 3). The first service 152 will then unblock the request and provide the reply, at 306, by displaying the reply via the application 122, at 308. This way, the user is given the experience of synchronous communication.

Still referring to FIG. 3, the fallback behavior is used if the request cannot be processed in time (e.g., a 4 second timeout is illustrated) or when a failure occurs (e.g., a service failure, a session failure, a routing failure, or the like). Based on detection of the timeout and/or the failure, the command controller of the instance handling the request may send a notification to the client 120 to display the error (e.g., the timeout to the user at 310 and/or the failure to the user at 312). The notification may additionally or alternatively indicate that the command is still in process, at 314. In other embodiments, notification is provided. Rather, the client 22 would not receive a response to its request and fail with a timeout after meeting a threshold amount of time. At 316, a refresh of the frontend application 122 (e.g., the user's browser session) may occur. As described herein, the refresh may occur manually by the user or automatically by the application 122 until the command is completed. At 308, the first service 152 will then unblock the request and provide the reply by displaying the reply via the application 122, at 308. Accordingly, the messaging system 100 may resiliently and consistently account for errors in the processing of the request and provide an improved user experience.

Figure 5:
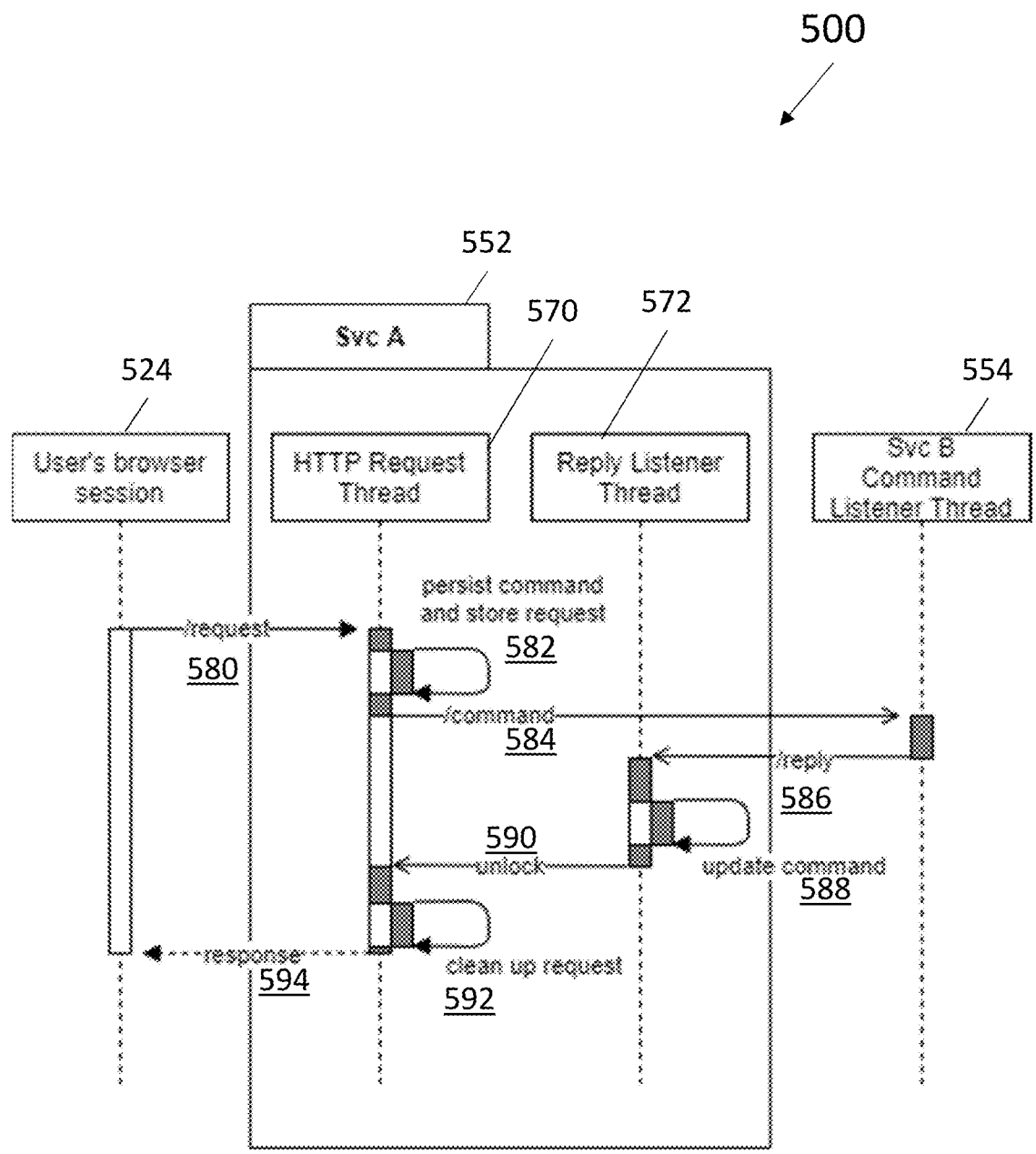
FIG. 5 depicts an example swim lane diagram showing an example messaging workflow to execute a request, in accordance with some example embodiments.

FIG. 5 depicts an example swim lane diagram 500 showing an example messaging workflow processed by the messaging system 100 to execute a request, in accordance with some example embodiments. In this example, the workflow may not include an error. The example messaging workflow includes a user's browser session 524, such as at the application 122, a first service 552, and a second service 554. The first service 552 shown in FIG. 5 may represent a first instance of the first service 552 that includes a plurality of threads including a request thread 570 and a reply listener thread 572. The second service 554 includes a command listener thread. The browser session 524, the first service 552, the second service 554, the request thread 570, the reply listener thread 572, and the command listener thread are the same as or similar to the browser session, the first service, the second service, the request thread, the reply listener thread, and the command listener thread, respectively, described herein in the various examples and may include the same or similar properties as the browser session, the first service, the second service, the request thread, the reply listener thread, and the command listener thread, as described herein in the various examples.

At 580, the request thread 570 receives a request 580 to initiate a process for executing the request using the first service 552 and the second service 554. The received request calls the command controller (e.g., the first command controller instance 110A and/or the second command controller instance 110B shown in FIG. 2B), which is a shared instance between all threads of the first service 552. The request thread 570 persists the request, via the command controller as a command in a database (e.g., the database 140), and stores the request itself in memory of the first service 552, such as in in-service memory. The request thread 570 may additionally or alternatively store, with the command, an identifier of the request thread handling the request. As described herein, the database is accessible to all instances of the first service 5524. This helps to accommodate for errors in the process, while providing a smooth user experience. This configuration also helps to ensure a smooth and improved user experience even in scenarios in which there are no errors in the process.

At 584, the request thread 570 sends the command (e.g., in a command message), such as via the message broker 170, to the second service 554. The command processes at least part of the request received by the first service 552. The command controller blocks (e.g., locks) the request thread 570 and enters a waiting mode. The command controller may use an in-memory class instance to block the current thread via the monitor pattern. The reply thread can then release the lock, so the request processing thread can continue. The listener thread of the second service 554 receives the command, processes the command, and sends a reply (e.g., in a reply message) to the first service 552 including a response to the command. The reply listener thread 572 listens to reply messages and receives the reply, at 586, from the second service 554. In response to receiving the reply, the reply listener thread 572 updates the command in the database 140 to include the reply and searches for the associated request thread. The reply listener thread 572 unlocks the request thread 570 at 592, cleans up the stored request at 592, and provides the response at 594 to the client 120 to complete the process. As described herein, this configuration helps to accommodate for errors in the process, while providing a smooth user experience, and helps to ensure a smooth and improved user experience even in scenarios in which there are no errors in the process.

Figure 6:
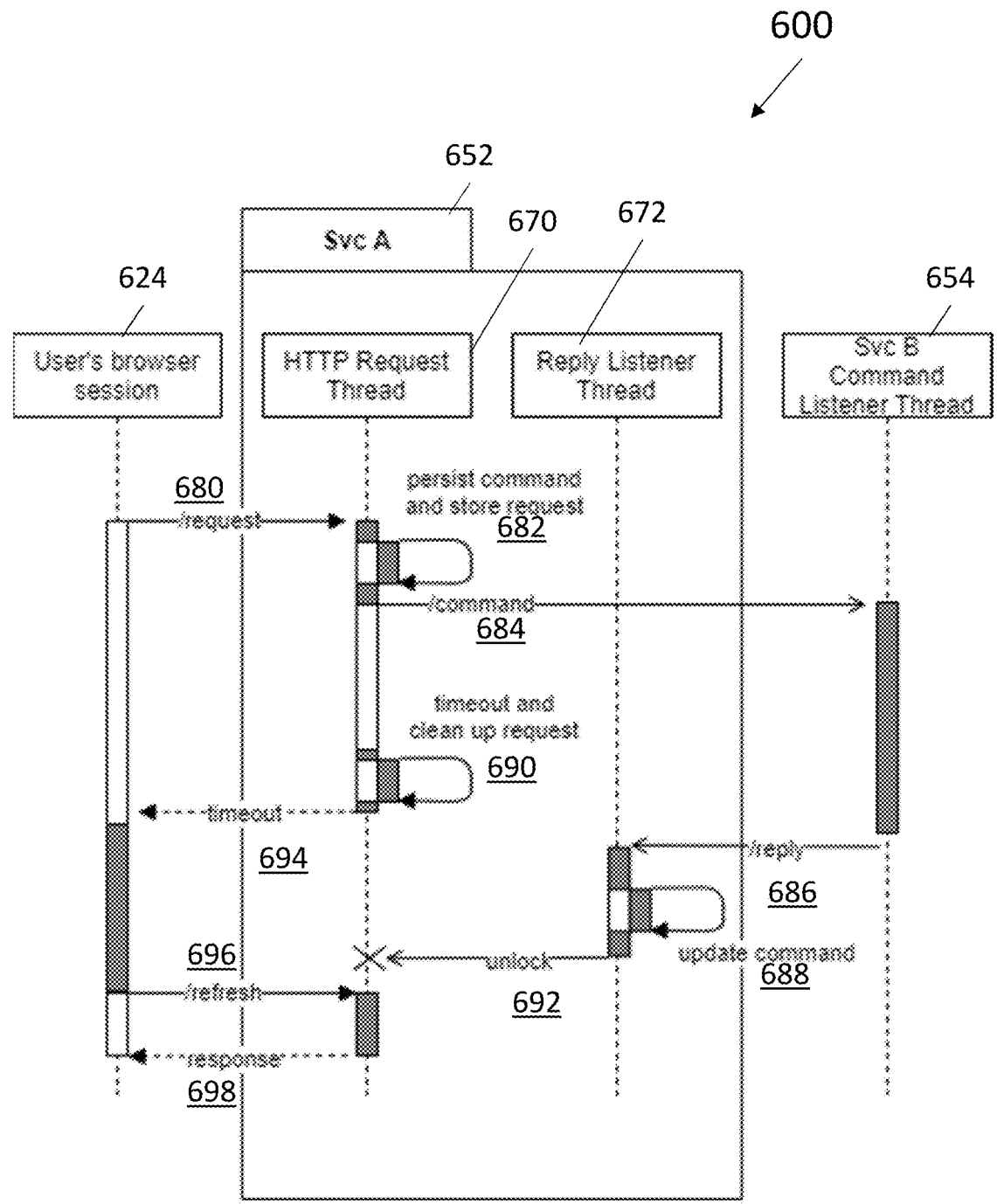
FIG. 6 depicts an example swim lane diagram showing an example messaging workflow to execute a request, in accordance with some example embodiments.

FIG. 6 depicts an example swim lane diagram 600 showing an example messaging workflow processed by the messaging system 100 to execute a request, in accordance with some example embodiments. In this example, the workflow may include a timeout error, as discussed in more detail below. The example messaging workflow includes a user's browser session 624, such as at the application 122, a first service 652, and a second service 654. The first service 652 shown in FIG. 6 may represent a first instance of the first service 652 that includes a plurality of threads including a request thread 670 and a reply listener thread 672. The second service 654 includes a command listener thread. The browser session 624, the first service 652, the second service 654, the request thread 670, the reply listener thread 672, and the command listener thread are the same as or similar to the browser session, the first service, the second service, the request thread, the reply listener thread, and the command listener thread, respectively, described herein in the various examples and may include the same or similar properties as the browser session, the first service, the second service, the request thread, the reply listener thread, and the command listener thread, as described herein in the various examples.

At 680, the request thread 670 receives a request 680 to initiate a process for executing the request using the first service 652 and the second service 654. The received request calls the command controller (e.g., the first command controller instance 110A and/or the second command controller instance 110B shown in FIG. 2B), which is a shared instance between all threads of the first service 652. The request thread 670 persists the request as a command in a database (e.g., the database 140), and stores the request itself in memory of the first service 652, such as in in-service memory. The request thread 670 may additionally or alternatively store, with the command, an identifier of the request thread handling the request. As described herein, the database is accessible to all instances of the first service 652. This helps to accommodate for errors in the process, while providing a smooth user experience. This configuration also helps to ensure a smooth and improved user experience even in scenarios in which there are no errors in the process.

At 684, the request thread 670 sends the command (e.g., in a command message), such as via the message broker 170, to the second service 654. The command processes at least part of the request received by the first service 652. The command controller blocks (e.g., locks) the request thread 670 and enters a waiting mode. At 690, a timeout error is determined. A timeout defines how long an unused connection can stay open. The connection is closed if the process takes longer than expected. Closing the connection frees up blocked resources. The timeout may be detected when the request thread 670 is in the waiting mode for an amount of time that meets a threshold amount of time. The threshold may include one to two seconds, two to three seconds, three to four seconds, four to five seconds, five to six seconds, five to ten seconds, ten to thirty seconds, or the like. In other words, the error was determined when the reply was not received by the first service 652, or when the request thread was not otherwise unblocked within the threshold amount of time. In response to detecting the timeout error, tan error response indicating the timeout at 694 may be transmitted via the client 122. The error response may indicate the error (e.g., timeout) in the process and may include an instruction to refresh the application, such as after a certain period of time. In other embodiments, no error response is provided. Rather, the client 122 would not receive a response to its request and fail with a timeout after meeting a threshold amount of time.

In the meantime, the listener thread of the second service 654 receives the command, processes the command, and sends a reply (e.g., in a reply message) to the first service 652 including a response to the command. The reply listener thread 672 listens to reply messages and receives the reply, at 686, from the second service 654. In response to receiving the reply, the reply listener thread 672 updates the command in the database 140 at 688 to include the reply and searches for the associated request thread. Since the timeout error occurred and the connection was closed, the reply listener thread 672 may not locate the associated reply thread. At 696, after a refresh of the application 122 at the client 120 via which the request was received, the reply listener thread 672 locates the request thread 670 based on the information stored in the database 140, unblocks (e.g., unlocks) the request thread 570 at 692, and provides the response at 698 to the client 120 to complete the process. As described herein, this configuration helps to accommodate for errors, such as timeout errors.

Figure 7:
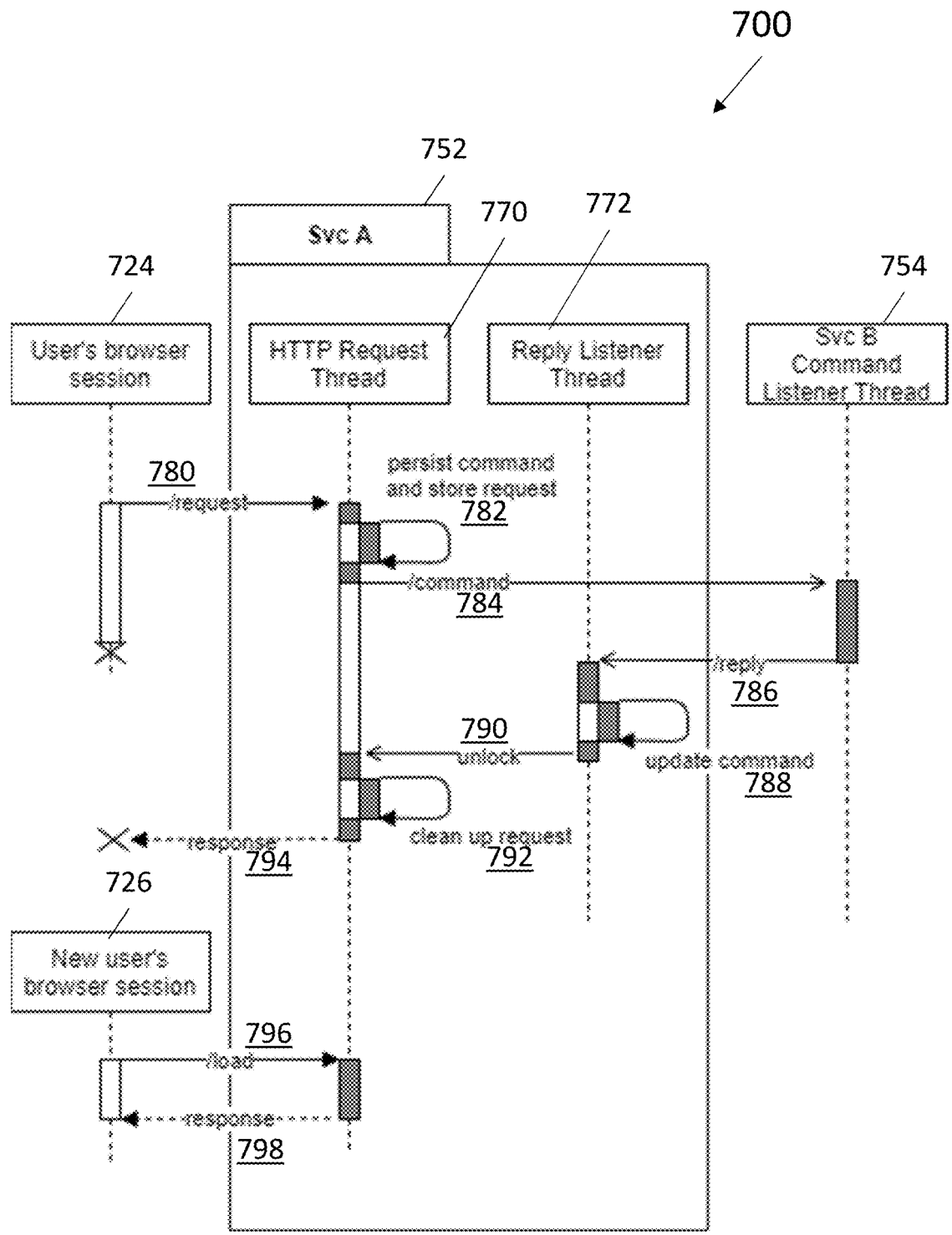
FIG. 7 depicts an example swim lane diagram showing an example messaging workflow to execute a request, in accordance with some example embodiments.

FIG. 7 depicts an example swim lane diagram 700 showing an example messaging workflow processed by the messaging system 100 to execute a request, in accordance with some example embodiments. In this example, the workflow may include a session failure error, as discussed in more detail below. The example messaging workflow includes a user's browser session 724, such as at the application 122, a first service 752, and a second service 754. The first service 752 shown in FIG. 7 may represent a first instance of the first service 752 that includes a plurality of threads including a request thread 770 and a reply listener thread 772. The second service 754 includes a command listener thread. The browser session 724, the first service 752, the second service 754, the request thread 770, the reply listener thread 772, and the command listener thread are the same as or similar to the browser session, the first service, the second service, the request thread, the reply listener thread, and the command listener thread, respectively, described herein in the various examples and may include the same or similar properties as the browser session, the first service, the second service, the request thread, the reply listener thread, and the command listener thread, as described herein in the various examples.

At 780, the request thread 770 receives a request 780 to initiate a process for executing the request using the first service 752 and the second service 754. The received request calls the command controller (e.g., the first command controller instance 110A and/or the second command controller instance 110B shown in FIG. 2B), which is a shared instance between all threads of the first service 752. The request thread 770 persists the request as a command in a database (e.g., the database 140), and stores the request itself in memory of the first service 752, such as in in-service memory. The request thread 770 may additionally or alternatively store, with the command, an identifier of the request thread handling the request. As described herein, the database is accessible to all instances of the first service 752. This helps to accommodate for errors in the process, while providing a smooth user experience. This configuration also helps to ensure a smooth and improved user experience even in scenarios in which there are no errors in the process.

At 784, the request thread 770 sends the command (e.g., in a command message), such as via the message broker 170, to the second service 754. The command controller blocks (e.g., locks) the request thread 770 and enters a waiting mode. The listener thread of the second service 754 receives the command, processes the command, and sends a reply (e.g., in a reply message) to the first service 752 including a response to the command. The reply listener thread 772 listens to reply messages and receives the reply, at 786, from the second service 754. In response to receiving the reply, the reply listener thread 772 updates the command at 788 in the database 140 to include the reply and searches for the associated request thread. The reply listener thread 772 unlocks the request thread 770 at 790, cleans up the stored request at 792, and provides the response at 794 to the client 120 to complete the process. However, a session failure is determined. A session failure can occur if the user navigates to another page or closes the browser at the application 122 of the client 120. In other instances, the overall operating system or the network connection might produce a failure which interrupts the session at the application 122.

In some embodiments, in response to the request thread 770 attempting to reply to the request and determining that the client 122 has closed the connection (e.g., due to the user closing the page, and/or the like, an error response indicating the session failure is transmitted via the client 122. T The error response may include an instruction to refresh the application, such as after a certain period of time. In other embodiments, no error response is provided. Rather, the client 122 would not receive a response to its request and fail with a timeout after meeting a threshold amount of time. At 796, after a refresh of the application 122 at the client 120 via which the request was received, the request thread 770 provides the response at 798 to the client 120 to complete the process. As described herein, this configuration helps to accommodate for errors, such as session failure errors.

Figure 8:
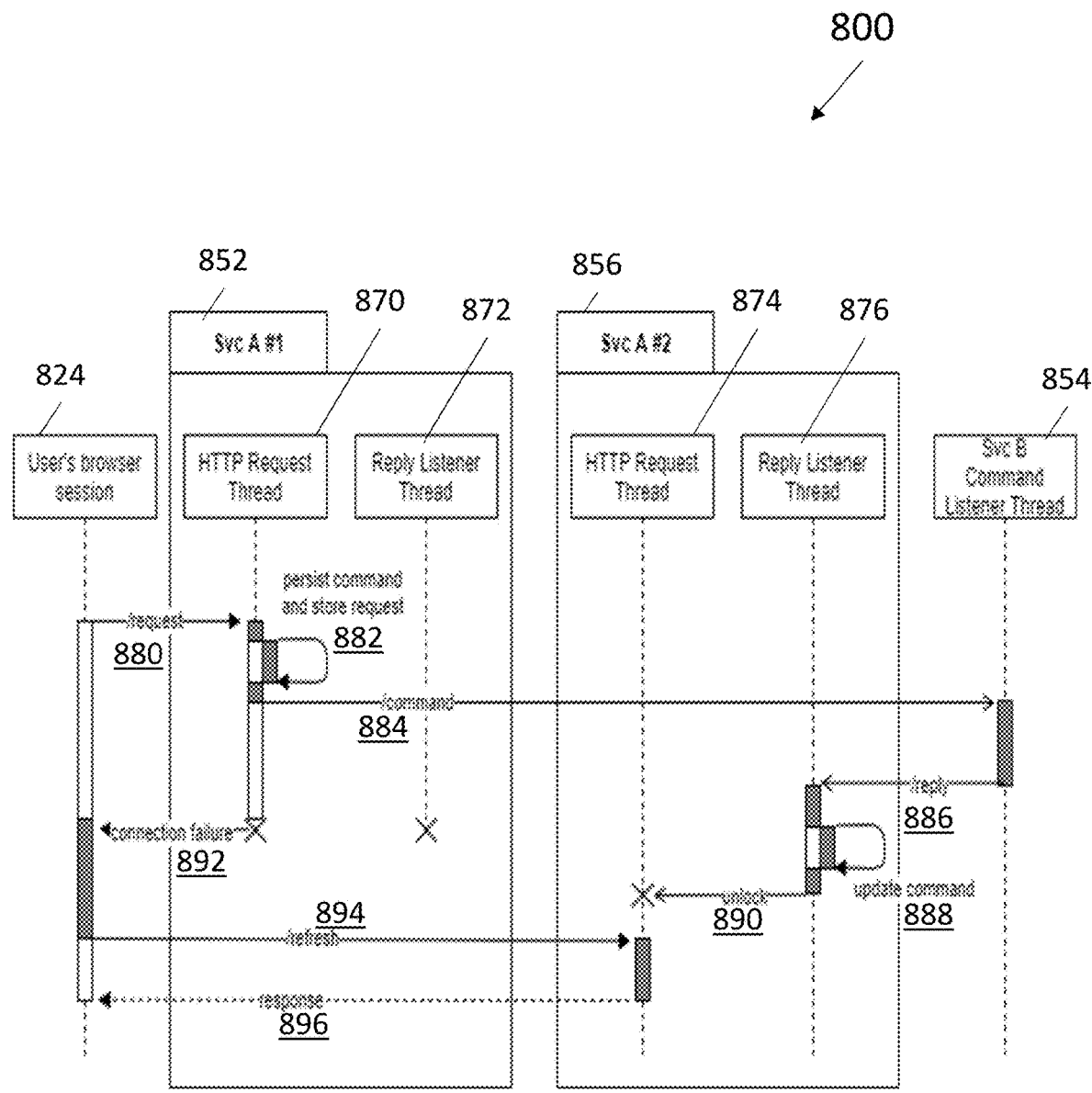
FIG. 8 depicts an example swim lane diagram showing an example messaging workflow to execute a request, in accordance with some example embodiments.

FIG. 8 depicts an example swim lane diagram 800 showing an example messaging workflow processed by the messaging system 100 to execute a request, in accordance with some example embodiments. In this example, the workflow may include a service failure error, as discussed in more detail below. The example messaging workflow includes a user's browser session 824, such as at the application 122, a first instance of the first service 852, a second instance of the first service 856, and a second service 854. The first instance (e.g., which is the same as or similar to the first first service instance 152A or other instances described herein) of the first service 852 includes a plurality of threads including a request thread 880 and a reply listener thread 872. The second instance (e.g., which is the same as or similar to the second first service instance 152B or other instances described herein) of the first service 856 includes a plurality of threads including a request thread 874 and a reply listener thread 876. The second service 854 includes a command listener thread. The browser session 824, the first and second instances of the first service 852, 856, the second service 854, the request thread 880, the reply listener thread 882, and the command listener thread are the same as or similar to the browser session, the first service, the second service, the request thread, the reply listener thread, and the command listener thread, respectively, described herein in the various examples and may include the same or similar properties as the browser session, the first service, the second service, the request thread, the reply listener thread, and the command listener thread, as described herein in the various examples.

At 880, the request thread 870 receives a request to initiate a process for executing the request using the first instance of the first service 852 and the second service 854. The received request calls the command controller (e.g., the first command controller instance 110A and/or the second command controller instance 110B shown in FIG. 2B), which is a shared instance between the first instance of the first service 852 and the second instance of the first service 856. At 882, the request thread 870 persists the request as a command in a database (e.g., the database 140), which is shared between the first instance of the first service 852 and the second instance of the first service 856, and stores the request itself in memory of the first instance of the first service 852, such as in in-service memory. The request thread 870 may additionally or alternatively store, with the command, an identifier of the request thread handling the request. As described herein, the database is accessible to the first instance of the first service 852 and the second instance of the first service 856. This helps to accommodate for errors in the process, while providing a smooth user experience.

At 892, a service error failure occurs. The service failure occurs when the first instance of the first service crashes, restarts, or is otherwise stopped due to a horizontal scale down. In this case, the reply would be handled by another instance of the first service (e.g., the second instance of the first service 856), which does not hold an open HTTP-connection with the user's browser session 824. In response to detecting the service failure at 892, an error response may be provided that indicates the error (e.g., a service or connection failure) in the process and may include an instruction to refresh the application, such as after a certain period of time. In other embodiments, no error response is provided. Rather, the client 22 would not receive a response to its request and fail with a timeout after meeting a threshold amount of time.

In the meantime, the listener thread of the second service 854 receives the command, processes the command, and sends a reply (e.g., in a reply message) to the first service including a response to the command. In this example, where the instance that sent the command (e.g., the first instance of the first service 852 experiences failure, the second instance of the first service 856 would "take over" the reply processing from the first instance of the first service 852. The second service 854 may still transmit the reply to the first instance of the first service 853, since the second service 854 would not know about the failure. The reply listener thread 876 of the second instance of the first service 856 listens to reply messages and receives the reply, at 886, from the second service 854. In response to receiving the reply, the reply listener thread 876 updates the command in the database 140 at 888 to include the reply and searches for the associated request thread. Since the service failure occurred and the connection was closed, the reply listener thread 876 may not locate the associated request which was stored in the local memory of the first instance of the first service 852. At 894, a refresh of the application 122 occurs at the client 120 via which the request was received. After the refresh, the reply listener thread 876 locates the request thread 874 based on the information stored in the database 140, unblocks (e.g., unlocks) the request thread 874 at 890, and provides the response at 896 to the client 120 to complete the process. As described herein, this configuration helps to accommodate for errors, such as service failures.

Figure 9:
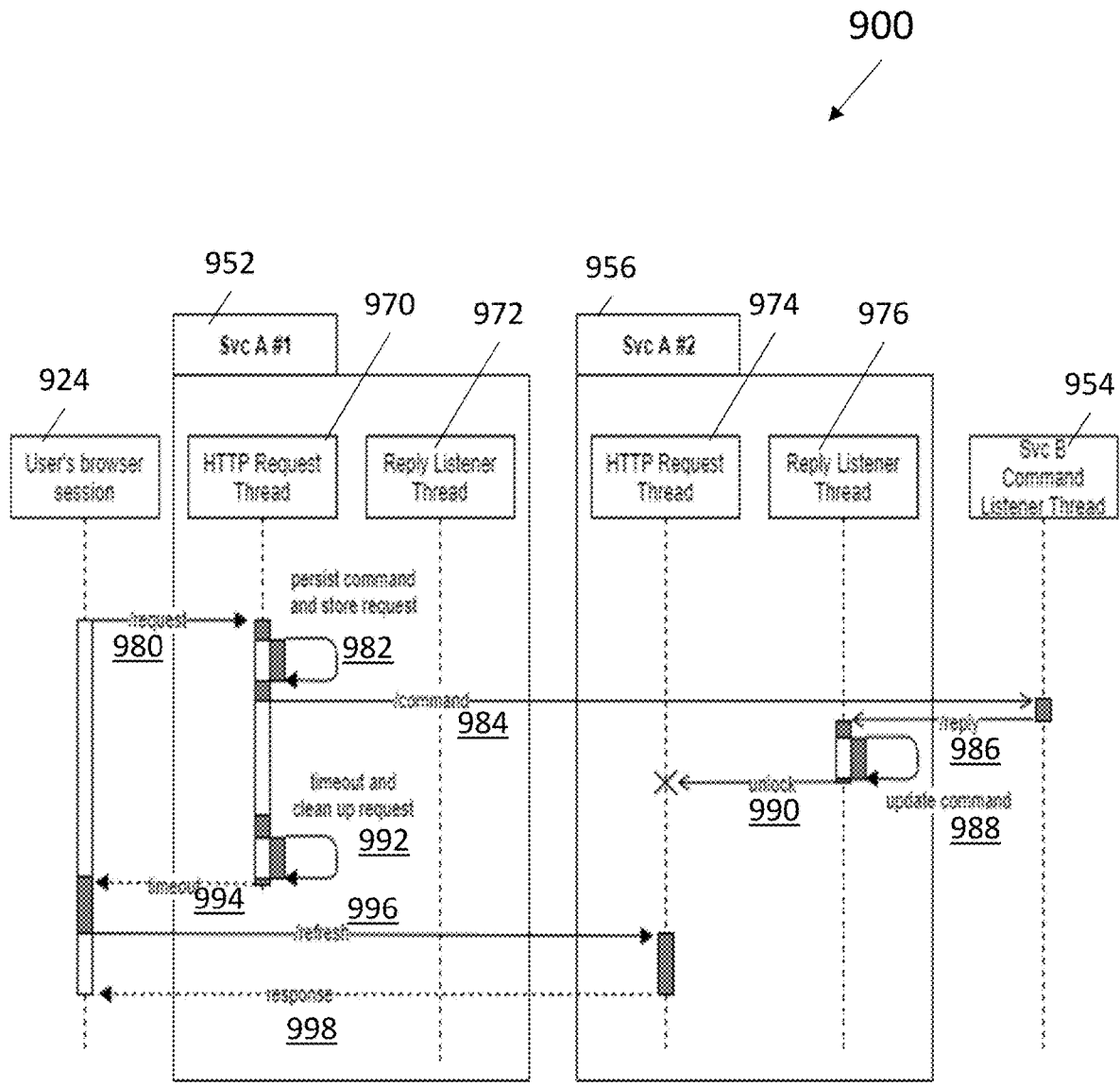
FIG. 9 depicts an example swim lane diagram showing an example messaging workflow to execute a request, in accordance with some example embodiments.

FIG. 9 depicts an example swim lane diagram 900 showing an example messaging workflow processed by the messaging system 100 to execute a request, in accordance with some example embodiments. In this example, the workflow may include a partition or routing failure error, as discussed in more detail below, which may be caused by repartitioning. As described herein a routing failure and a partition failure may be used interchangeably. The example messaging workflow includes a user's browser session 924, such as at the application 122, a first instance of the first service 952, a second instance of the first service 956, and a second service 954. The first instance of the first service 952 (e.g., which is the same as or similar to the first first service instance 152A or other instances described herein) includes a plurality of threads including a request thread 990 and a reply listener thread 972. The second instance of the first service 956 (e.g., which is the same as or similar to the second first service instance 152B or other instances described herein) includes a plurality of threads including a request thread 974 and a reply listener thread 976. The second service 954 includes a command listener thread. The browser session 924, the first and second instances of the first service 952, 956, the second service 954, the request thread 990, the reply listener thread 992, and the command listener thread are the same as or similar to the browser session, the first service, the second service, the request thread, the reply listener thread, and the command listener thread, respectively, described herein in the various examples and may include the same or similar properties as the browser session, the first service, the second service, the request thread, the reply listener thread, and the command listener thread, as described herein in the various examples.

At 980, the request thread 970 receives a request to initiate a process for executing the request using the first instance of the first service 952 and the second service 954. The received request calls the command controller (e.g., the first command controller instance 110A and/or the second command controller instance 110B shown in FIG. 2B), which is a shared instance between all threads of the first instance of the first service 952. At 982, the request thread 970 persists the request as a command in a database (e.g., the database 140), and stores the request itself in memory of the first instance of the first service 952, such as in in-service memory. The request thread 970 may additionally or alternatively store, with the command, an identifier of the request thread handling the request. As described herein, the database is accessible to the first service 952 and/or the second service 954, along with any instances of the first service and/or the second service 954, including the first and second instances of the first service. This helps to accommodate for errors in the process, while providing a smooth user experience.

At 984, the request thread 970 sends the command (e.g., in a command message), such as via the message broker 170, to the second service 954. The command controller blocks (e.g., locks) the request thread 970 and enters a waiting mode. At 992, an error such as a timeout and/or a partition or routing failure is determined. In this example, the number of running instances of the first service may increase due to horizontal scaling and/or partition rebalancing A partition rebalancing assigns the reply partition to a newly started or already existing instance of the first service, such as the second instance of the first service 956. Thus, the reply message might be processed by a different instance of the first service. As a result of the rebalancing, for example, the reply message may be routed to the incorrect instance of the first service (e.g., the second instance instead of the first instance, or visa versa). If load hits the messaging system 100, the messaging system 100 may scale up to a greater number of service instances. The messaging system 100 would then reassign the partitions between all instances. This may mean that the partition, which was provided by first instance of the first service 952 as the reply partition for a command that it sent, is re-assigned to another instance, such as the second instance of the second service 956.

Such configurations can result in a timeout, which defines how long an unused connection can stay open. The connection is closed if the process takes longer than expected. Closing the connection frees up blocked resources. The timeout may be detected when the request thread 970 is in the waiting mode for an amount of time that meets a threshold amount of time. The threshold may include one to two seconds, two to three seconds, three to four seconds, four to five seconds, five to six seconds, five to ten seconds, ten to thirty seconds, or the like. In other words, the error occurred when the reply was not received by the first instance of the first service 952, such as within the threshold amount of time. In response to detecting the timeout and/or the partition failure, an error response may be provided indicating the error (e.g., timeout) in the process and may include an instruction to refresh the application, such as after a certain period of time. In other embodiments, no error response is provided. Rather, the client 122 would not receive a response to its request and fail with a timeout after meeting a threshold amount of time.

In the meantime, the listener thread of the second service 954 receives the command, processes the command, and sends a reply (e.g., in a reply message) to the second instance of the first service 956 including a response to the command. The reply listener thread 976 of the second instance of the first service 956 listens to reply messages and receives the reply, at 986, from the second service 954. In response to receiving the reply, the reply listener thread 976 updates the command in the database 140 at 988 to include the reply and searches for the associated request thread. Since the partition failure occurred and the connection was closed, the reply listener thread 976 may not locate the associated request which was stored in the local memory of the first instance of the first service 952. At 996, a refresh of the application 122 occurs at the client 120 via which the request was received. After the refresh, the reply listener thread 976 locates the request thread 974 based on the information stored in the database 140, unblocks (e.g., unlocks) the request thread 974 at 990, and provides the response at 998 to the client 120 to complete the process. As described herein, this configuration helps to accommodate for errors, such as partition failures.

Figure 10:
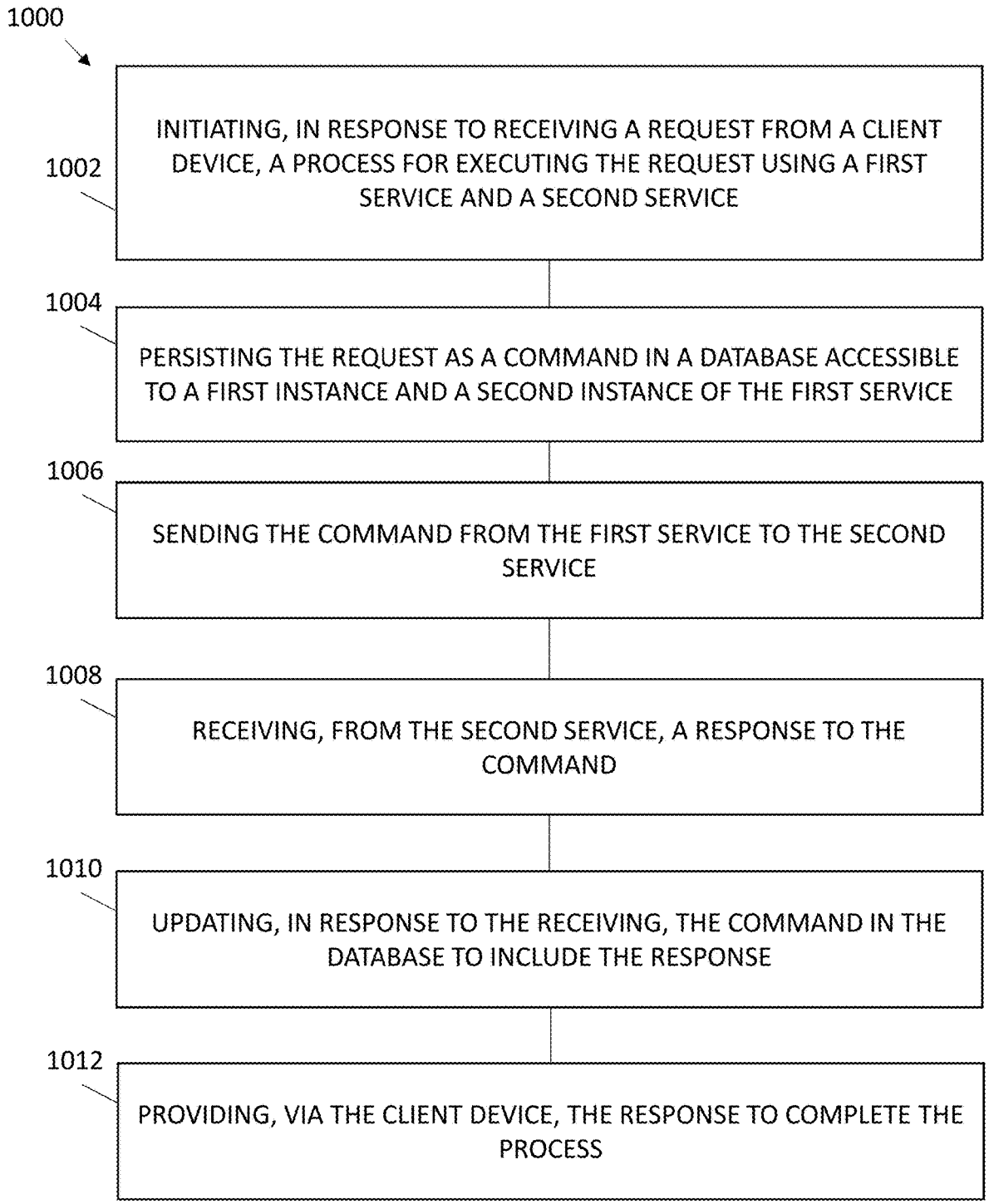
FIG. 10 depicts a flowchart illustrating a process for executing a request, in accordance with some example embodiments.

FIG. 10 depicts a flowchart illustrating a process 1000 for processing requests using a resilient asynchronous request-reply architecture, in accordance with some example embodiments. Referring to FIGS. 1-9, one or more aspects of the process 1000 may be performed by the messaging system 110, such as the client 120, the message broker 170, the services 150, including any instances of the services, and/or the like. As described herein, the messaging system 100 helps to accommodate for errors in the process, while providing a smooth user experience, and helps to ensure a smooth and improved user experience even in scenarios in which there are no errors in the process.

At 1002, a process for executing a request using a first service and a second service may be initiated. The process may be initiated in response to receiving the request from a client device, such as the client 120. The request may include an HTTP request. The first service and/or the second service may each include a plurality of instances, such as a first instance, a second instance, and so on. Each of the instances of the first service and/or the second service may include a plurality of threads, such as a pool of threads (also referred to herein as thread pools). The plurality of threads may include at least one request thread and at least one listener thread. The threads may be assigned to handle the request, to listen for the command, and/or to listen to a reply to the command.

At 1004, the request may be persisted as a command in a database. The database, as described herein may be accessible to a first instance of the first service and a second instance of the first service. Additionally or alternatively, an identifier of the thread (e.g., a first thread) that received the request and/or an association between the command and the thread may be stored in the database. In some embodiments, the request itself may also be stored in the local memory of the first service, such as the first instance of the first service.

At 1006, the command may be sent from the first service to the second service. For example, the first thread may send the command from the first service. In some embodiments, the command is sent to a message broker, which locates the second service and sends the command as part of a command message to the second service.

At 1008, the response to the command is received from the second service. For example, the first service, such as the first instance of the first service, may include a second thread such as a listener reply thread that listens for the reply. The reply including the response may be received by the listener reply thread (e.g., the second thread).

At 1010, the first service may update the command in the database to include the response, in response to receiving the response to the command from the second service. For example, the second thread of the first instance of the first service may update the command and/or store information associated with the response in the database.

At 1012, the response may be provided, such as by the first thread, to the client device to complete the process. In some embodiments, an error is determined before or after receiving the reply from the second service. For example, an error may include at least one of a timeout prior to receiving the response, a session failure, a service failure, and a routing failure. The at least one of the timeout, the session failure, the service failure, and the routing failure may be configured to cause the request to be inaccessible for at least a period of time. After a refresh of an application at the client device and/or the client device, the response may be provided to the client device. In some embodiments, after the refresh, the first thread of the first instance of the first service may be unblocked, allowing the response to be provided to complete the process.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system, comprising: at least one data processor; and at least one memory storing instructions, which when executed by the at least one data processor, result in operations comprising: initiating, in response to receiving a request from a client device, a process for executing the request using a first service and a second service; persisting the request as a command in a database accessible to a first instance of the first service and a second instance of the first service, wherein the persisting is performed by a first thread of the first instance, and wherein the persisting comprises storing an association between the first thread and the command; sending, by the first thread, the command from the first service to the second service; receiving, by a second thread of the first instance and from the second service, a response to the command; updating, by the second thread and in response to the receiving, the command in the database to include the response; and providing, by the first thread and via the client device, the response to complete the process.

Example 2: The system of example 1, wherein the operations further comprise: determining an error in the process; wherein the response is provided after a refresh of an application at the client device.

Example 3: The system of example 2, wherein the operations further comprise: unblocking, after the refresh, the first thread of the first instance of the first service, the unblocking configured to allow the response to be provided to complete the process.

Example 4: The system of any one of examples 2 to 3, wherein the error includes at least one of a timeout prior to receiving the response, a session failure, a service failure, and a routing failure; wherein the at least one of the timeout, the session failure, the service failure, and the routing failure are configured to cause the request to be closed at the first instance of the first service.

Example 5: The system of any one of examples 1 to 4, wherein the operations further comprise storing, at the first service, the request in a local memory of the first instance of the first service.

Example 6: The system of example 5, wherein the first thread is configured to call a command controller to persist the request in the local memory of the first instance of the first service.

Example 7: The system of any one of examples 1 to 6, wherein the request is an HTTP-request.

Example 8: The system of any one of examples 1 to 7, wherein the first thread is at least one request thread and the second thread is at least one listener thread.

Example 9: A computer-implemented method, comprising: initiating, in response to receiving a request from a client device, a process for executing the request using a first service and a second service; persisting the request as a command in a database accessible to a first instance of the first service and a second instance of the first service, wherein the persisting is performed by a first thread of the first instance, and wherein the persisting comprises storing an association between the first thread and the command; sending, by the first thread, the command from the first service to the second service; receiving, by a second thread of the first instance and from the second service, a response to the command; updating, by the second thread and in response to the receiving, the command in the database to include the response; and providing, by the first thread and via the client device, the response to complete the process.

Example 10: The method of example 9, wherein the operations further comprise: determining an error in the process; wherein the response is provided after a refresh of an application at the client device.

Example 11: The method of example 10, unblocking, after the refresh, the first thread of the first instance of the first service, the unblocking configured to allow the response to be provided to complete the process.

Example 12: The method of any one of examples 10 to 11, wherein the error includes at least one of a timeout prior to receiving the response, a session failure, a service failure, and a routing failure; wherein the at least one of the timeout, the session failure, the service failure, and the routing failure are configured to cause the request to be closed at the first instance of the first service.

Example 13: The method of any one of examples 9 to 12, wherein the operations further comprise storing, at the first service, the request in a local memory of the first instance of the first service.

Example 14: The system of example 13, wherein the first thread is configured to call a command controller to persist the request in the local memory of the first instance of the first service.

Example 15: The method of any one of examples 9 to 14, wherein the request is an HTTP-request.

Example 16: The method of any one of examples 9 to 15, wherein the first thread is at least one request thread and the second thread is at least one listener thread.

Example 17: A non-transitory computer-readable medium storing instructions, which when executed by at least one data processor, result in operations comprising: initiating, in response to receiving a request from a client device, a process for executing the request using a first service and a second service; persisting the request as a command in a database accessible to a first instance of the first service and a second instance of the first service, wherein the persisting is performed by a first thread of the first instance, and wherein the persisting comprises storing an association between the first thread and the command; sending, by the first thread, the command from the first service to the second service; receiving, by a second thread of the first instance and from the second service, a response to the command; updating, by the second thread and in response to the receiving, the command in the database to include the response; and providing, by the first thread and via the client device, the response to complete the process.

Example 18: The non-transitory computer readable medium of example 17, wherein the operations further comprise: determining an error in the process; wherein the response is provided after a refresh of an application at the client device.

Example 19: The non-transitory computer readable medium of example 18, unblocking, after the refresh, the first thread of the first instance of the first service, the unblocking configured to allow the response to be provided to complete the process.

Figure 11:
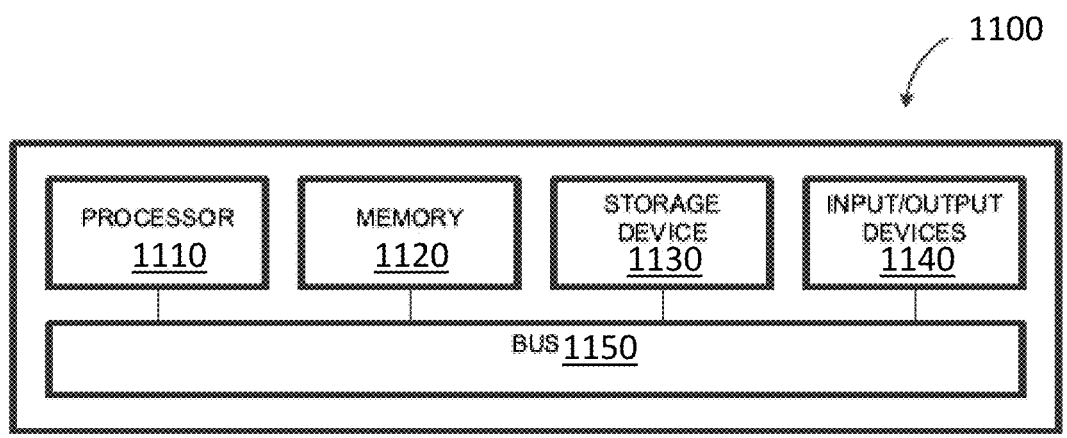
FIG. 11 depicts a block diagram illustrating a computing system, in accordance with some example embodiments.

Example 20: The non-transitory computer readable medium of any one of examples 18 to 20, wherein the error includes at least one of a timeout prior to receiving the response, a session failure, a service failure, and a routing failure; wherein the at least one of the timeout, the session failure, the service failure, and the routing failure are configured to cause the request to be closed at the first instance of the first service. FIG. 11 depicts a block diagram illustrating a computing system 1100 consistent with implementations of the current subject matter. Referring to FIGS. 1 and 11, the computing system 1100 can be used to implement the command controller 110, the client 120, the message broker 130, the services 150, the messaging system 100, and/or any components therein.

As shown in FIG. 11, the computing system 1100 can include a processor 1110, a memory 1120, a storage device 1130, and indication/output devices 1140. The processor 1110, the memory 1120, the storage device 1130, and the indication/output devices 1140 can be interconnected via a system bus 1150. The processor 1110 is capable of processing instructions for execution within the computing system 1100. Such executed instructions can implement one or more components of, for example, the messaging system 100 at the database 140. In some example embodiments, the processor 1110 can be a single-threaded processor. Alternately, the processor 1110 can be a multi-threaded processor. The processor 1110 is capable of processing instructions stored in the memory 1120 and/or on the storage device 1130 to display graphical information for a user interface provided via the indication/output device 1140.

The memory 1120 is a computer readable medium such as volatile or non-volatile that stores information within the computing system 1100. The memory 1120 can store data structures representing configuration object databases, for example. The storage device 1130 is capable of providing persistent storage for the computing system 1100. The storage device 1130 can be a floppy disk device, a hard disk device, an optical disk device, a tape device, a solid state device, and/or other suitable persistent storage means. The indication/output device 1140 provides indication/output operations for the computing system 1100. In some example embodiments, the indication/output device 1140 includes a keyboard and/or pointing device. In various implementations, the indication/output device 1140 includes a display unit for displaying graphical user interfaces.

According to some example embodiments, the indication/output device 1140 can provide indication/output operations for a network device. For example, the indication/output device 1140 can include Ethernet ports or other networking ports to communicate with one or more wired and/or wireless networks (e.g., a local area network (LAN), a wide area network (WAN), the Internet).

In some example embodiments, the computing system 1100 can be used to execute various interactive computer software applications that can be used for organization, analysis and/or storage of data in various formats. Alternatively, the computing system 1100 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the indication/output device 1140. The user interface can be generated and presented to a user by the computing system 1100 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one indication device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide indication to the computer. Other kinds of devices can be used to provide for interaction with a user as well. For example, feedback provided to the user can be any form of sensory feedback, such as for example visual feedback, auditory feedback, or tactile feedback; and indication from the user may be received in any form, including acoustic, speech, or tactile indication. Other possible indication devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
at least one data processor; and
at least one memory including instructions, which when executed by the at least one data processor, result in operations comprising:
initiating, in response to receiving a request from a client device, a process for executing the request using a first service and a second service;
persisting the request as a command in a database accessible to a first instance of the first service and a second instance of the first service, wherein the persisting is performed by a first thread of the first instance, and wherein the persisting comprises storing an association between the first thread and the command;
sending, by the first thread, the command from the first service to the second service;
receiving, by a second thread of the first instance and from the second service, a response to the command;
updating, by the second thread and in response to the receiving, the command in the database to include the response; and
providing, by the first thread and via the client device, the response to complete the process;
wherein in response to determining an error in the process, the response is provided after a refresh of an application at the client device and unblocking, after the refresh, the first thread of the first instance of the first service, wherein the unblocking is configured to allow the response to be provided to complete the process.

2. The system of claim 1, wherein the error includes at least one of a timeout prior to receiving the response, a session failure, a service failure, and a routing failure; wherein the at least one of the timeout, the session failure, the service failure, and the routing failure are configured to cause the request to be closed at the first instance of the first service.

3. The system of claim 1, wherein the operations further comprise storing, at the first service, the request in a local memory of the first instance of the first service.

4. The system of claim 3, wherein the first thread is configured to call a command controller to persist the request in the local memory of the first instance of the first service.

5. The system of claim 1, wherein the request is an HTTP request.

6. The system of claim 1, wherein the first thread is at least one request thread and the second thread is at least one listener thread.

7. A computer-implemented method, comprising:
initiating, in response to receiving a request from a client device, a process for executing the request using a first service and a second service;
persisting the request as a command in a database accessible to a first instance of the first service and a second instance of the first service, wherein the persisting is performed by a first thread of the first instance, and wherein the persisting comprises storing an association between the first thread and the command;
sending, by the first thread, the command from the first service to the second service;
receiving, by a second thread of the first instance and from the second service, a response to the command;
updating, by the second thread and in response to the receiving, the command in the database to include the response; and
providing, by the first thread and via the client device, the response to complete the process;
wherein in response to determining an error in the process, the response is provided after a refresh of an application at the client device and unblocking, after the refresh, the first thread of the first instance of the first service, wherein the unblocking is configured to allow the response to be provided to complete the process.

8. The method of claim 7, wherein the error includes at least one of a timeout prior to receiving the response, a session failure, a service failure, and a routing failure; wherein the at least one of the timeout, the session failure, the service failure, and the routing failure are configured to cause the request to be closed at the first instance of the first service.

9. The method of claim 7, further comprising storing, at the first service, the request in a local memory of the first instance of the first service.

10. The method of claim 9, wherein the first thread is configured to call a command controller to persist the request in the local memory of the first instance of the first service.

11. The method of claim 7, wherein the request is an HTTP request.

12. The method of claim 7, wherein the first thread is at least one request thread and the second thread is at least one listener thread.

13. A non-transitory computer-readable medium storing instructions, which when executed by at least one data processor, result in operations comprising:
initiating, in response to receiving a request from a client device, a process for executing the request using a first service and a second service;
persisting the request as a command in a database accessible to a first instance of the first service and a second instance of the first service, wherein the persisting is performed by a first thread of the first instance, and wherein the persisting comprises storing an association between the first thread and the command;
sending, by the first thread, the command from the first service to the second service;
receiving, by a second thread of the first instance and from the second service, a response to the command;
updating, by the second thread and in response to the receiving, the command in the database to include the response; and
providing, by the first thread and via the client device, the response to complete the process;
wherein in response to determining an error in the process, the response is provided after a refresh of an application at the client device and unblocking, after the refresh, the first thread of the first instance of the first service, wherein the unblocking is configured to allow the response to be provided to complete the process.

14. The non-transitory computer readable medium of claim 13, wherein the error includes at least one of a timeout prior to receiving the response, a session failure, a service failure, and a routing failure; wherein the at least one of the timeout, the session failure, the service failure, and the routing failure are configured to cause the request to be closed at the first instance of the first service.

\* \* \* \* \*